United States Patent
Friend

(10) Patent No.: US 11,694,501 B2
(45) Date of Patent: Jul. 4, 2023

(54) REFRIGERATED VENDING SYSTEM AND METHOD

(71) Applicant: True Manufacturing Company, Inc., O'Fallon, MO (US)

(72) Inventor: John Friend, Washington, MO (US)

(73) Assignee: TRUE MANUFACTURING CO., INC., O'fallon, MO (US)

(*) Notice: Subject to any disclaimer, the term of this patent is extended or adjusted under 35 U.S.C. 154(b) by 312 days.

(21) Appl. No.: 17/176,637

(22) Filed: Feb. 16, 2021

(65) Prior Publication Data

US 2021/0256791 A1 Aug. 19, 2021

Related U.S. Application Data

(60) Provisional application No. 62/977,624, filed on Feb. 17, 2020.

(51) Int. Cl.
*A47F 10/02* (2006.01)
*G07F 9/02* (2006.01)
(Continued)

(52) U.S. Cl.
CPC .............. *G07F 9/026* (2013.01); *A47F 3/002* (2013.01); *A47F 10/02* (2013.01); *G07F 9/105* (2013.01)

(58) Field of Classification Search
CPC ...................................................... G07F 9/026
See application file for complete search history.

(56) References Cited

U.S. PATENT DOCUMENTS 7,044,370 B2 5/2006 Bellis et al.
7,846,286 B2 12/2010 Gelli
(Continued)

FOREIGN PATENT DOCUMENTS

CN 103400451 B 9/2015
CN 208925505 U 6/2019
(Continued)

OTHER PUBLICATIONS

Krader, "Your Next Steak Could Come From a Vending Machine", retrieved from https://bloomber.com/news/articles/2018-08-22/applestone-meat-s-steak-vending-machine, Aug. 22, 2018, 6 pp.
(Continued)

*Primary Examiner* — Gene O Crawford
*Assistant Examiner* — Ayodeji T Ojofeitimi
(74) *Attorney, Agent, or Firm* — Stinson LLP

(57) ABSTRACT

A refrigerated vending system can conduct automatic purchase transactions. A refrigerated cooler has a refrigerated compartment with a door. An automatic lock selectively locks and unlocks the door, and a door sensor detects when the door closes. A three-dimensional imaging sensor inside the compartment captures a three-dimensional image of the merchandise. A vending transaction controller detects presentation of a method of payment, unlocks the door, determines from the door sensor that the door has been opened and closed, locks the door when it closes, actuates the three-dimensional imaging sensor to capture an updated three-dimensional image of the merchandise after the door closes, determines based on the updated image what refrigerated merchandise was removed while the door was open, and charges the method of payment for the refrigerated merchandise removed.

29 Claims, 7 Drawing Sheets

(51) Int. Cl.
*A47F 3/00* (2006.01)
*G07F 9/10* (2006.01)

(56) References Cited

U.S. PATENT DOCUMENTS

| | | | |
|---|---|---|---|
| 8,150,658 B2 | 4/2012 | Beniyama et al. |
| 8,229,802 B2 | 7/2012 | Henry |
| 8,260,456 B2 | 9/2012 | Siegel et al. |
| 8,442,878 B2 | 5/2013 | Henry |
| 8,468,059 B2 | 6/2013 | Enqvist |
| 8,788,341 B1 | 7/2014 | Patel et al. |
| 9,224,124 B2 | 12/2015 | Rahim et al. |
| 9,349,238 B2 | 5/2016 | Tkachenko et al. |
| 9,727,838 B2 | 8/2017 | Campbell |
| 9,996,818 B1 | 6/2018 | Ren et al. |
| 10,007,892 B1 | 6/2018 | Hahn et al. |
| 10,064,502 B1 | 9/2018 | Gyori et al. |
| 10,133,933 B1 | 11/2018 | Fisher et al. |
| 10,140,483 B1 | 11/2018 | Huebner et al. |
| 10,181,113 B2 | 1/2019 | Rivalto et al. |
| 10,197,434 B2 | 2/2019 | Heske, III |
| 10,198,710 B1 | 2/2019 | Hahn et al. |
| 10,222,279 B1 | 3/2019 | Legrand, III et al. |
| 10,262,293 B1 | 4/2019 | Prater et al. |
| 10,262,294 B1 | 4/2019 | Hahn et al. |
| 10,268,983 B2 | 4/2019 | Kumar et al. |
| 10,311,263 B2 | 6/2019 | Wang et al. |
| 10,318,919 B2 | 6/2019 | Rodriguez et al. |
| 10,332,066 B1 | 6/2019 | Palaniappan et al. |
| 10,339,656 B1 | 7/2019 | Le et al. |
| 10,410,449 B2 | 9/2019 | Jones et al. |
| 10,466,095 B1 | 11/2019 | O'Neill et al. |
| 10,520,352 B1 | 12/2019 | Shi et al. |
| 10,520,353 B1 | 12/2019 | Shi et al. |
| 10,540,631 B1 | 1/2020 | Munger |
| 10,586,208 B2 | 3/2020 | Buibas et al. |
| 10,591,348 B1 | 3/2020 | Shi et al. |
| 10,619,964 B2 | 4/2020 | Cole |
| 10,782,183 B2 | 9/2020 | Heske, III |
| 10,782,762 B2 | 9/2020 | Ryu |
| 10,783,491 B2 | 9/2020 | Buibas et al. |
| 10,809,122 B1 | 10/2020 | Danenberg et al. |
| 10,810,540 B1 | 10/2020 | Gopal et al. |
| 10,852,178 B2 | 12/2020 | Heske, III |
| 10,878,585 B1 | 12/2020 | Boulio et al. |
| 10,891,586 B1 | 1/2021 | Kramarov et al. |
| 10,935,416 B1 | 3/2021 | Worley |
| 10,943,285 B1 | 3/2021 | Grigsby et al. |
| 2004/0188455 A1* | 9/2004 | Shioya ............ G07F 11/32 221/123 |
| 2005/0279122 A1 | 12/2005 | Cohen et al. |
| 2008/0103939 A1* | 5/2008 | Gibb ............ G07F 9/02 705/28 |
| 2013/0284806 A1 | 10/2013 | Margalit |
| 2013/0299509 A1 | 11/2013 | Yasaka |
| 2014/0312051 A1* | 10/2014 | Rose, Jr. ............ G07F 7/0609 221/124 |
| 2014/0316916 A1* | 10/2014 | Hay ............ G06Q 20/20 705/17 |
| 2015/0206373 A1* | 7/2015 | Kim ............ G07F 11/58 221/150 R |
| 2015/0322694 A1* | 11/2015 | Carr ............ G07C 9/00944 70/277 |
| 2016/0132120 A1 | 5/2016 | Fan et al. |
| 2017/0011384 A1 | 1/2017 | Tkachenko et al. |
| 2017/0148005 A1 | 5/2017 | Murn |
| 2017/0301173 A1 | 10/2017 | Hindsgaul |
| 2018/0374144 A1 | 12/2018 | Smilowitz et al. |
| 2019/0034861 A1 | 1/2019 | Gaur et al. |
| 2019/0172298 A1 | 6/2019 | Just |
| 2019/0335145 A1 | 10/2019 | Izawa et al. |
| 2019/0378104 A1 | 12/2019 | Winsor |
| 2020/0027218 A1 | 1/2020 | Buibas et al. |
| 2020/0042969 A1 | 2/2020 | Ray |
| 2020/0082328 A1 | 3/2020 | Drissner |
| 2020/0202137 A1 | 6/2020 | Li et al. |
| 2020/0202163 A1 | 6/2020 | Feng et al. |
| 2020/0258069 A1 | 8/2020 | Ma et al. |
| 2021/0035399 A1 | 2/2021 | Dai et al. |
| 2021/0043022 A1 | 2/2021 | Dai et al. |

FOREIGN PATENT DOCUMENTS

| | | |
|---|---|---|
| CN | 110400416 A | 11/2019 |
| EP | 3532773 A1 | 8/2019 |
| WO | 2018014882 A1 | 1/2018 |
| WO | 2018081386 A1 | 5/2018 |
| WO | 2019234692 A1 | 12/2019 |

OTHER PUBLICATIONS

International Search Report and Written Opinion, from PCT/US2021/018275, dated Jun. 25, 2021, 16 pp.

Konica Minolta, 3D-LiDAR, Technologies for the Future, Dec. 6, 2019, 9 pages.

Chris Johnston, Amazon opens a supermarket with no checkouts, BBC News, Jan. 22, 2018, 19 pages.

* cited by examiner

REFRIGERATED VENDING SYSTEM AND METHOD

CROSS-REFERENCE TO RELATED APPLICATION

This application claims priority to U.S. Provisional Patent Application Ser. No. 62/977,624, which was filed on Feb. 17, 2020, and is hereby incorporated by reference in its entirety for all purposes.

BACKGROUND

Typical refrigerated vending systems only enable customers to purchase one item of merchandise per-transaction. A customer must pay for and select one item and then, if another item is desired, the customer must again present payment and select the other item. Other types of refrigerated vending systems are also known.

For example, US Patent Application Publication No. 2013/0284806, which is hereby incorporated by reference in its entirety, discloses a vending system in which a customer uses a mobile application to authorize electronic payment at a refrigerated cooler identified via QR code and then opens the door of a refrigerated cooler, removes any number of desired pieces of merchandise from the refrigerator, and closes the door. The items are supported on electronic scales. So after the door is closed, the weight of the items removed from the scales can be determined. And from this determination, the system estimates the quantity of items that have been removed and charges the customer for the total purchase.

RFID-based vending systems are also known. For example, the Pantry Company is one known seller of RFID-based vending systems.

SUMMARY

In one aspect, a refrigerated vending system for conducting automatic purchase transactions for refrigerated merchandise comprises a refrigerated cooler comprising a cabinet having a refrigerated compartment and a door connected to the cabinet for movement with respect to the cabinet between a closed position in which the door closes the refrigerated compartment and an open position in which the door opens the refrigerated compartment. The cabinet comprises one or more shelves for supporting the refrigerated merchandise in the refrigerated compartment of the refrigerated cooler. An automatic lock is configured to selectively lock and unlock the door in the closed position. A door sensor is configured to detect movement of the door between the open position and the closed position. A three-dimensional imaging sensor is inside the refrigerated cooler. The three-dimensional imaging sensor is configured to capture a three-dimensional image of the refrigerated compartment of the cabinet. An electronic payment terminal is supported on the refrigerated cooler. A vending transaction controller is configured to detect presentation of a method of payment to the electronic payment terminal, actuate the automatic lock to unlock the door, determine based on the door sensor that the door has been opened and closed after actuating the automatic lock to unlock the door, actuate the automatic lock to lock the door in response to determining based on the door sensor that the door has been opened and closed, actuate the three-dimensional imaging sensor to capture an updated three-dimensional image of the refrigerated compartment in response to determining based on the door sensor that the door has been opened and closed, determine, based on the updated three-dimensional image, the refrigerated merchandise that was removed while the door was open, and charge the method of payment that was presented to the electronic payment terminal for the refrigerated merchandise that was removed while the door was open.

In another aspect, a refrigerated vending system for vending refrigerated merchandise comprises a refrigerated cooler comprising a cabinet having a refrigerated compartment for holding the refrigerated merchandise. One or more sensors in the refrigerated compartment are for refrigerated merchandise in the refrigerated compartment. A vending transaction controller is connected to the one or more sensors and configured for executing a purchase transaction for the refrigerated merchandiser using information from the one or more sensors. One or more communications lines extend from the one or more sensors to the vending transaction controller. The vending system also comprises an electronics enclosure. The vending transaction controller is located in the electronics enclosure. The one or more communications lines connect to the vending transaction controller inside the electronics enclosure. The refrigerated compartment has a volume. The electronics enclosure has a volume that is less than 15% of the volume of the refrigerated compartment.

Other aspects and features will become apparent hereinafter.

BRIEF DESCRIPTION OF THE DRAWINGS

Corresponding parts are given corresponding reference numbers throughout the drawings.

DETAILED DESCRIPTION

The inventor has recognized a number of drawbacks to the scale-based vending system disclosed in US Patent Application Publication No. 2013/0284806. For instance, loading the refrigerated cooler with multiple types of items having different purchase prices can lead to errors. The typical approach is to load individual scales with only items of a particular unit-price and unit-weight. In theory, when a purchaser removes any item from the respective scale, the system will be able to determine that one item of a particular price has been removed from the respective scale after the door is closed. In practice, however, the purchaser has access to the entire interior of the refrigerated cooler. So oftentimes, the purchaser will rifle through the available merchandise without regard to the arrangement of particular items on particular scales. When the purchaser finally removes one or more items and closes the door, some of the remaining items are supported on the wrong scales, which adversely affects the accuracy of the purchase price that is charged for the removed items.

The scale-based vending system of US Patent Application Publication No. 2013/0284806 is also very cumbersome to implement. The scales themselves take up significant space within the interior of the refrigerated cooler. In some cases, the scales can disrupt air flow through the cooler and thereby adversely affect refrigeration performance. Moreover, the scales require a large electronic control system that adds substantially to the overall footprint of the refrigerated cooler. In addition, it is very time-consuming to configure the system so that particular scales are registered to merchandise at a particular price point and weight. Furthermore, the scales and supporting electronics are very expensive to implement.

Figure 1:
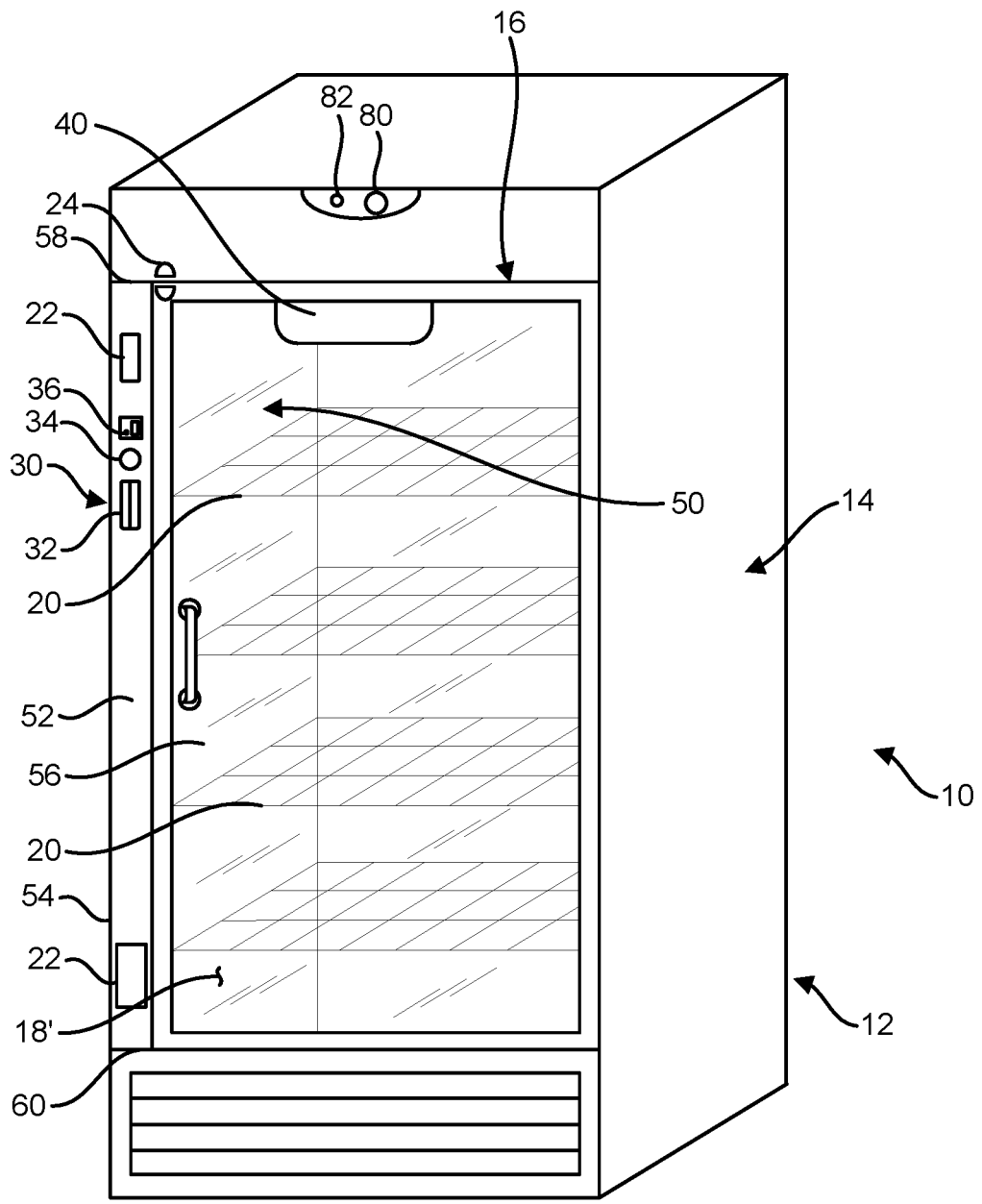
FIG. 1 is a perspective of a refrigerated vending system.
Figure 2:
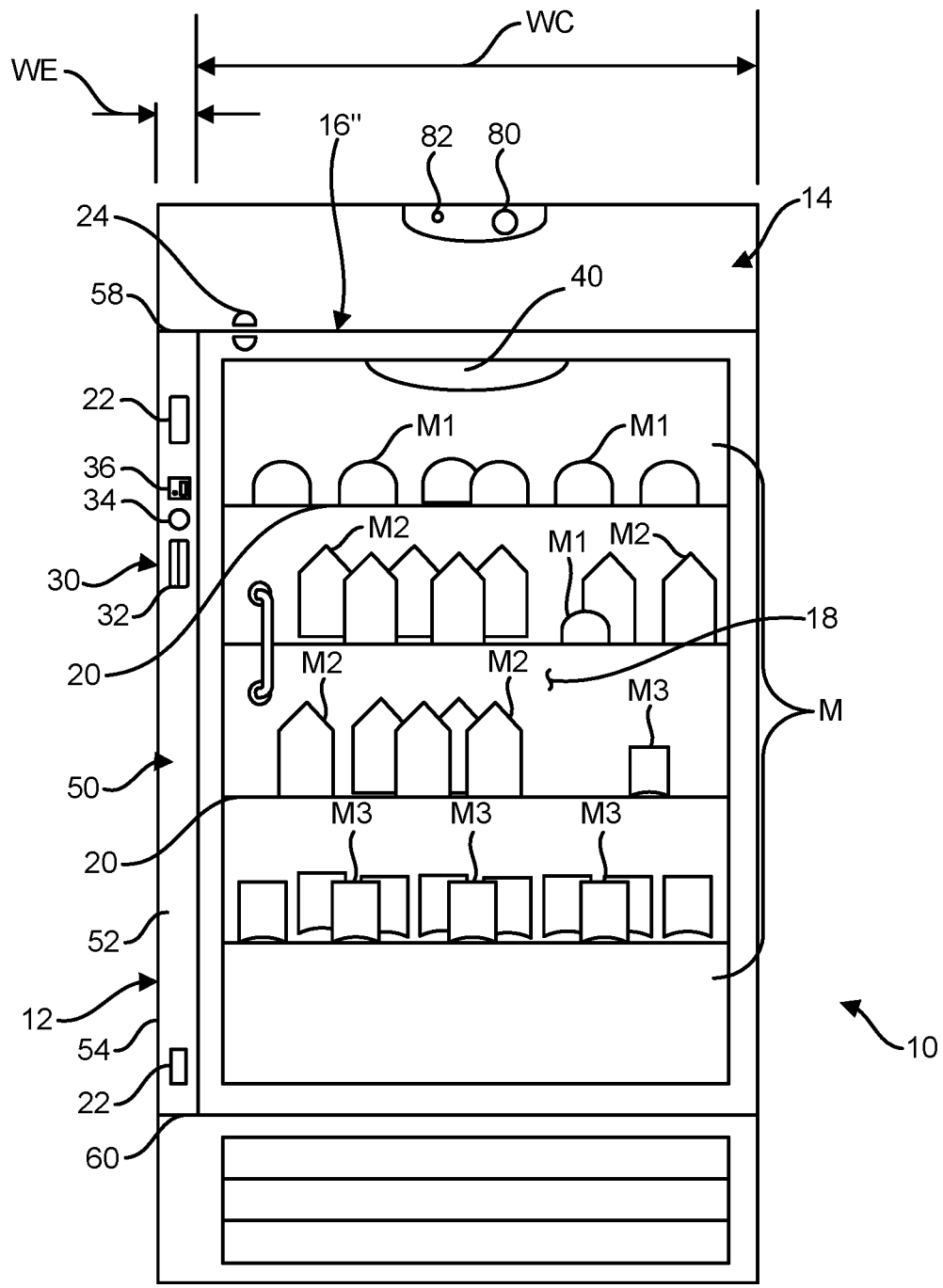
FIG. 2 is a front elevation of the refrigerated vending system loaded with merchandise.
Figure 3:
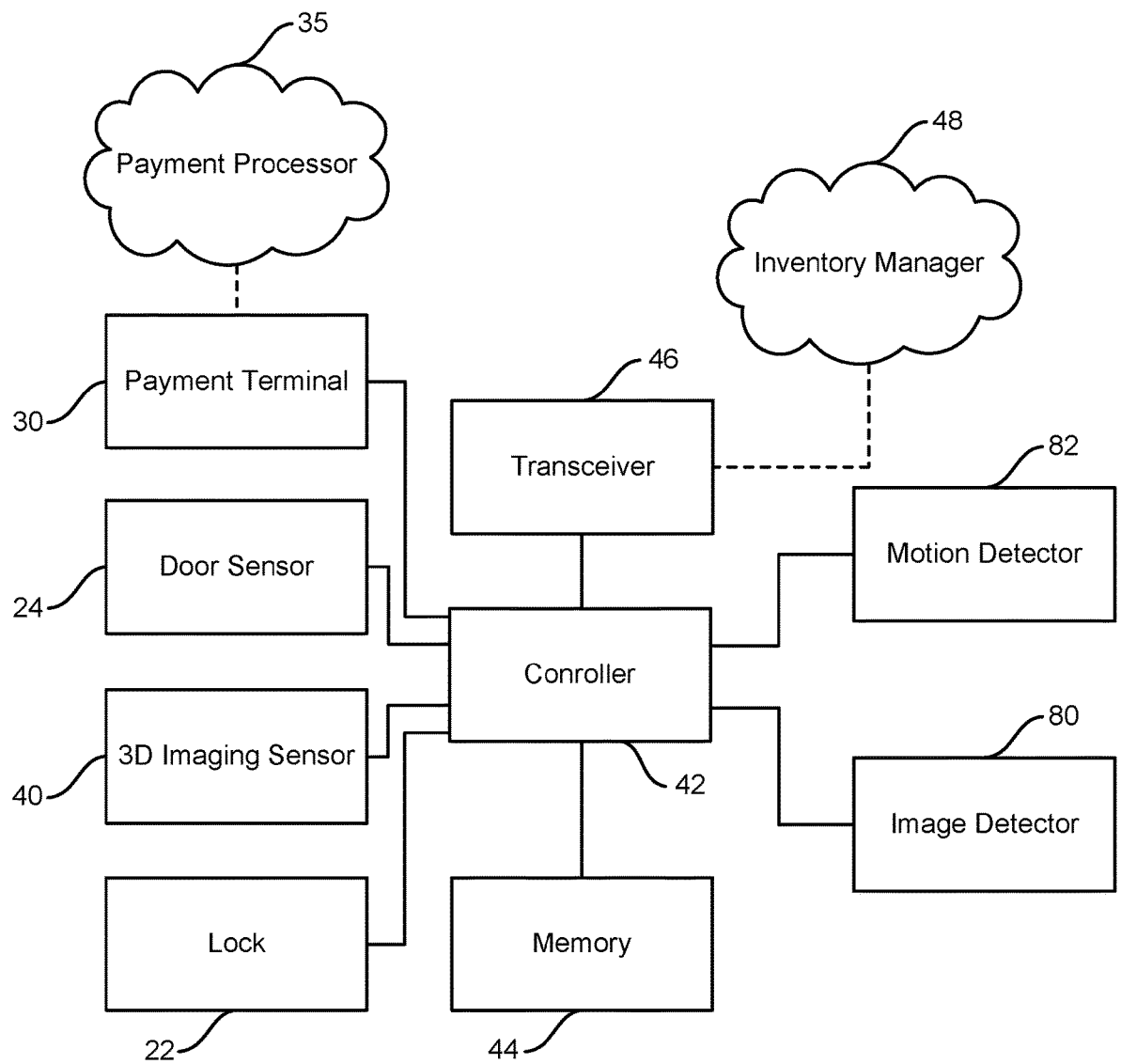
FIG. 3 is a schematic block diagram of a control system of the refrigerated vending system.

Referring now to FIGS. 1-3, one embodiment of a refrigerated vending system in the scope of this disclosure is generally indicated at reference number 10. The refrigerated vending system includes a refrigerated cooler 12 for receiving refrigerated merchandise M therein. The cooler 12 generally comprises a cabinet 14 and a door 16 movably connected to the cabinet. The cabinet 14 defines a refrigerated compartment 18. A plurality of shelves 20 are mounted on the cabinet 14 in the refrigerated compartment 18 at vertically spaced apart locations for supporting the merchandise M in the refrigerated compartment. In the illustrated embodiment, the shelves 20 comprises wire frame shelves with a plurality of openings through the thickness thereof. The openings are suitable for allowing electromagnetic radiation to pass freely through the shelves. As will be explained in further detail below, the electromagnetic radiation may enable the capture of three-dimensional images which map the contents of refrigerated compartment. It will be understood, however, that other types of shelves (e.g., glass shelves) may also be used to support the merchandise in one or more embodiments.

Furthermore, one or more merchandise organizers (not shown) may be supported on the shelves to control the dispensation of merchandise from the refrigerated cooler. For example, some or all of the merchandise can be supported on the shelves in can or bottle organizers such as the Trueflex bottle organizer sold by the assignee of the present application. As those skilled in the art will appreciate, such merchandise organizers hold merchandise in front-to-back columns and guide the merchandise in each column toward the front of the shelf via bottom surfaces that slant downward toward the front of the shelf. As a result, the customer is presented with all of the available merchandise options in an organized row at the front edge of the shelf. This encourages customers to select items from the front of the shelf and discourages the customer from rearranging the items of merchandise on the shelves. Moreover, this maintains the merchandise in consistent columns, which may make it easier to automatically determine accurate quantities of merchandise M in the refrigerated cooler based on a three-dimensional image of the interior. In one or more embodiments, the shelves 20 are vertically spaced apart so that the items of merchandise supported at the front of the shelf have limited overhead clearance with respect the wall or shelf located immediately above them. For example, the overhead clearance can be less than the maximum cross-sectional dimension of the merchandise items, making it very difficult for a purchaser to remove merchandise from any location except for the front of the shelf. In an embodiment, the overhead clearance above the merchandise on a shelf is less than or equal to 10 cm (e.g., less than or equal to 8 cm, less than or equal to 6 cm, less than or equal to 4 cm, etc.).

The door 16 is connected to the cabinet for movement with respect to the cabinet between a closed position in which the door closes the refrigerated compartment and an open position in which the door opens the refrigerated compartment. In the illustrated embodiment, the door comprises a framed, glass panel, outswing door. In general, glass panel doors may be particularly suited to refrigerated vending systems within the scope of this disclosure because they allow the purchaser to view the available merchandise in the refrigerated compartment before opening the door. A framed door may also enable routing signal carriers (e.g., wires, optical cables) through the door framing so that electronic devices may be supported directly on the door while still being concealed from the purchaser. However, it will be understood that door configurations other than that of a framed, glass panel, outswing door may be used in one or more embodiments.

An automatic lock 22 is configured to selectively lock and unlock the door 16 in the closed position. Various types of automated locking mechanisms are known to those skilled in the art and may be used without departing from the scope of the disclosure. For example, the automatic lock 22 can comprise a magnetic locking mechanism or a deadbolt locking mechanism in one or more embodiments. As will be explained in further detail below, the refrigerated vending system 10 is configured to control the automatic lock 22 to limit access to the merchandise M to paying customers.

A door sensor 24 is coupled to the refrigerated cooler 12 to detect movement of the door 16 between the open position and the closed position. Various types of door sensors are known to those skilled in the art and may be used without departing from the scope of the disclosure. For example, the door sensor 24 can comprise at least one of a proximity sensor and a contact sensor in one or more embodiments. As will be explained in further detail below, the refrigerated vending system 10 is configured to use the door sensor 24 to determine when a purchaser has completed his or her selection of merchandise M from the refrigerated cooler 12.

The illustrated refrigerated vending system 10 further comprises an electronic payment terminal 30 supported on the refrigerated cooler 12. In this case, where the user is not required to electronic selections of merchandise in order to engage in a vending transaction, the payment terminal 30 forms the primary (e.g., sole) user interface (e.g., electronic user input device) by which the user engages in a vending transaction. In the illustrated embodiment, the electronic payment terminal 30 comprises a credit card reader 32 and a contactless payment antenna 34. As shown in FIG. 3, the electronic payment terminal 30 is communicatively coupled to a remote payment processing server 35 to execute purchase transactions for merchandise M based on an electronic form of payment, such as a credit card or a mobile payment device, that is presented to one of the credit card reader or contactless payment antenna. Referring to FIGS. 1 and 2, the illustrated refrigerated vending system 10 also comprises a QR code 36 (broadly, a unique graphic cooler identifier) that may be used in combination with a refrigerated vending system mobile device payment application as described in U.S. Patent Application Publication No. 2013/0284806. Although it is contemplated that the payment terminal may have a cash or coin operated payment mechanism in one or more embodiments, the illustrated refrigerated vending system 10 does not accept cash payment for reasons that will be apparent hereinafter.

In the illustrated embodiment, the refrigerated vending system 10 is free of scales for detecting the quantity of merchandise that is removed from the refrigerated cooler 12 when the door 16 is opened. Instead, the illustrated vending system 10 includes a three-dimensional imaging sensor 40 inside the refrigerated cooler configured to capture three-dimensional images of the refrigerated compartment 18. The three-dimensional imaging sensor 40 broadly comprises a sensor for detecting merchandise M in the refrigerated compartment. The three-dimensional images captured by the imaging sensor depict all or part of the refrigerated compartment of the cooler. In the illustrated embodiment, the three-dimensional imaging sensor 40 comprises a single three-dimensional imaging unit mounted on a top wall of the refrigerated compartment 18. More particularly, the cabinet 12 has a top wall and the three-dimensional imaging sensor 40 is a single unit mounted on the top wall such that the three-dimensional image is taken vertically through the plurality of shelves 20. However, it will be understood that the refrigerated coolers can have other numbers and arrangements of three-dimensional imaging units without departing from the scope of this disclosure. For example, it is expressly contemplated that in one or more embodiments, the refrigerated vending system comprises a respective three-dimensional imaging sensor unit for each of the shelves in the refrigerated compartment. For instance, one three-dimensional imaging sensor unit can be mounted above, to the side of, or below each shelf in the refrigerated compartment for capturing three-dimensional images of the items supported on the respective shelf.

In an exemplary embodiment, the three-dimensional imaging sensor 40 comprises a radar imaging chip of the type sold by the Vayyar company of Yehud, Isreal. Such a radar imaging chip comprises a plurality of radar transceivers (e.g., 72 radar transceivers) that send and receive multimode radar signals in a wide radio frequency band (e.g., 3 GHz-81 GHz). Radar imaging chips within the scope of this disclosure may include an onboard processor and an internal memory storing processor-executable instructions that, when executed by the processor, cause the processor to perform high performance digital signal processing and imaging algorithms. Accordingly, in one or more embodiments the three-dimensional imaging sensor is configured to output a processed image signal representing a readable three-dimensional image of the refrigerated compartment, including visual indications of the size, shape, and position of every item of merchandise in the refrigerated compartment. Radar imaging chips of the type sold by Vayyar are capable of capturing three-dimensional images of three-dimensional space through solid objects, such as the upper shelves 20 and upper merchandise M in the illustrated refrigerated compartment 18. The three-dimensional images produced by such radar imaging chips are capable of mapping the size and shape of objects in a three-dimensional space to millimeter or near-millimeter accuracy.

Although radar imaging chips of the type sold by Vayyar constitute one type of three-dimensional imaging sensor that is suitable for use in the refrigerated vending system of this disclosure, it will be understood that other types of three-dimensional imaging sensors may be used in one or more embodiments. For example, it is contemplated that various LIDAR imaging sensors, structured light sensors, computed tomography sensors, laser scanners, stereophotogrammetry systems, and/or vertical-cavity surface-emitting laser imaging systems may be used to capture three-dimensional images of a portion or all of the interior of the refrigerated cooler in one or more embodiments.

Referring to FIGS. 1 and 2, the illustrated refrigerated vending system 10 further comprises an external imaging sensor 80 configured to capture images of a region in front of the refrigerated cooler 12. Any suitable imaging sensor may be used without departing from the scope of this disclosure. For example, in one or more embodiments the imaging sensor 80 comprises a three-dimensional imaging sensor of any type described above. In another embodiment, the imaging sensor 80 comprises a two-dimensional imaging sensor such as a digital camera sensor. As will be explained in further detail below, the imaging sensor 80 is configured to capture images of the region in front of the refrigerated vending system 10 that may be used to assess performance and usage of the refrigerated vending system. The images may also be used to present targeted marketing materials to the passerby (e.g., if the images indicate that the passerby is likely a child, the system can automatically present child-directed marketing materials on a nearby display; if the images indicate that the passerby is likely a male, the system can automatically present male-directed marketing materials on a nearby display; if the images indicate that the passerby is likely a female, the system can automatically present female-directed marketing materials on a nearby display). The illustrated refrigerated vending system 10 further comprises a motion detector 82 configured to detect motion in the region in front of the refrigerated vending system 10. In one or more embodiments, the external imaging sensor 80 is activated to capture images when the motion detector 82 detects motion in the region in front of the refrigerated cooler 12.

Referring to FIG. 3, the illustrated refrigerated vending system further comprises a vending transaction controller 42 operatively connected to the automatic lock 22, the door sensor 24, the electronic payment terminal 30, the three-dimensional imaging sensor 40, the external imaging sensor 80, and the motion detector 82. As will be explained in further detail below, the vending transaction controller 42 is configured to receive control inputs from and send control outputs to the connected devices 22, 24, 30, 40, 80, 82 to automate a vending purchase transaction. The controller 42 is also connected to a memory 44 that can store executable control instructions that are executed by the controller to automate a vending purchase transaction. Furthermore, the memory 44 can locally store data that is collected by one or more of the input devices 22, 24, 30, 40, 80, 82 that are connected to the controller 42. In the illustrated embodiment, the refrigerated vending system 10 further comprises a wireless transceiver 46 (broadly, a network communication link) configured to provide communication between the controller 42 and a remote inventory management server 48, e.g., a cloud-based inventory manager. The wireless transceiver 46 may comprise a Wi-Fi antenna or cellular data antenna in one or more embodiments. The controller 42 transmits data that is collected by the input devices 22, 24, 30, 40, 80, 82 to the inventory manager 48 via the transceiver 46. The inventory manager 48 stores the collected information remotely and/or uses the collected information to perform various inventory management functions, e.g., reporting changes in merchandise inventory (e.g., when restocking is required) to users on a real-time basis.

For example, the controller 42 may report to the inventory manager 48 data from the external image sensor 80 that indicates customer engagement with the vending system 10. In one or more embodiments, every time a customer passes in front of the refrigerated cooler 12, the controller 42 activates the image sensor to capture images of how the customer engages with the vending system 10. The controller 42 can send these images to the inventory manager 48. In one or more embodiments, the inventory manager 48 includes a processor configured to analyze the transmitted images to determine the frequency with which potential customers pass by the refrigerated cooler, the frequency with which potential customers who pass by the refrigerated cooler chose to interact with the refrigerated vending system, and the dwell time of each potential customer in front of the refrigerated cooler. Moreover, the image data from the external image sensor 80 may be combined with other information from the controller 42 that is transmitted to the inventory manager 48 to evaluate other commercial performance metrics such as the frequency with which potential customers ultimately make purchases, the types of merchandise that are most popular to purchase for different demographics, etc.

Referring again to FIGS. 1 and 2, in the illustrated embodiment, the refrigerated cooler includes an electronics enclosure 50 that is separate from the refrigerated compartment 18. Suitably, the electronic hardware of at least the controller 42 and the memory 44 is contained within the electronics enclosure 50. Further, communication lines (not shown; e.g., electrical wires or optical fibers) extend from the imaging sensor 40 to the controller 42 and connect to the controller at a location inside the enclosure. In the illustrated embodiment, the electronics enclosure 50 is defined by a front payment terminal support wall 52, a left side wall 54 (broadly, first exterior side wall) of the refrigerated cooler 12, a right divider wall 56 that separates the refrigerated compartment 18 from the interior of the electronics enclosure, a back wall of the refrigerated cooler, and upper and lower enclosure walls 58, 60 that are vertically spaced inwardly from the top and bottom of the cooler. As shown, the electronic payment terminal 30 is mounted externally on the payment terminal support wall 52 in the illustrated embodiment. The illustrated upper and lower enclosure walls 58, 60 are generally contiguous with the upper and lower walls of the refrigerated compartment 18. Further, the payment terminal support wall 52 is generally contiguous or in-plane with the door 16 when the door is closed. In other words, the payment terminal support wall 52 and the door 16 together define the front of the refrigerated cooler 12. Thus, the illustrated electronics enclosure 50 extends depthwise from the front of the cabinet 14 to the back of the cabinet, heightwise from the bottom of the refrigerated compartment 18 to the top of the refrigerated compartment, and widthwise from the left wall of the cabinet to the divider wall 56. In the illustrated embodiment, the refrigerated cooler 12 has a width WC and the electronics enclosure has a width WE along the width of the refrigerated cooler that is less than 20% (e.g. less than 15%, less than 10%, less than 5%, less than 4%, less than 3%) of the width of the refrigerated cooler. In one or more embodiments, the width WE is less than or equal to 10 cm (e.g., less than or equal to 8 cm, less than or equal to 5 cm). Relatedly, the refrigerated compartment has a volume and the electronics enclosure has a volume, wherein the volume of the electronics enclosure is less than 20% (e.g. less than 15%, less than 10%, less than 5%, less than 4%, less than 3%) of the volume of the refrigerated compartment. In one or more embodiments, the volume of the electronics enclosure is less than or equal to 3 cubic feet (e.g., less than or equal to 1 cubic feet, less than or equal to 0.5 cubic feet, less than or equal to 0.25 cubic feet, less than or equal to 0.1 cubic feet). By contrast the width and volume of similarly constructed electronics enclosures used in scale-based refrigerated vending system in accordance with US Patent Application Publication No. 2013/0284806 are much greater, leading to a refrigerated vending system with a greater footprint and/or less merchandise available for purchase.

Figure 5:
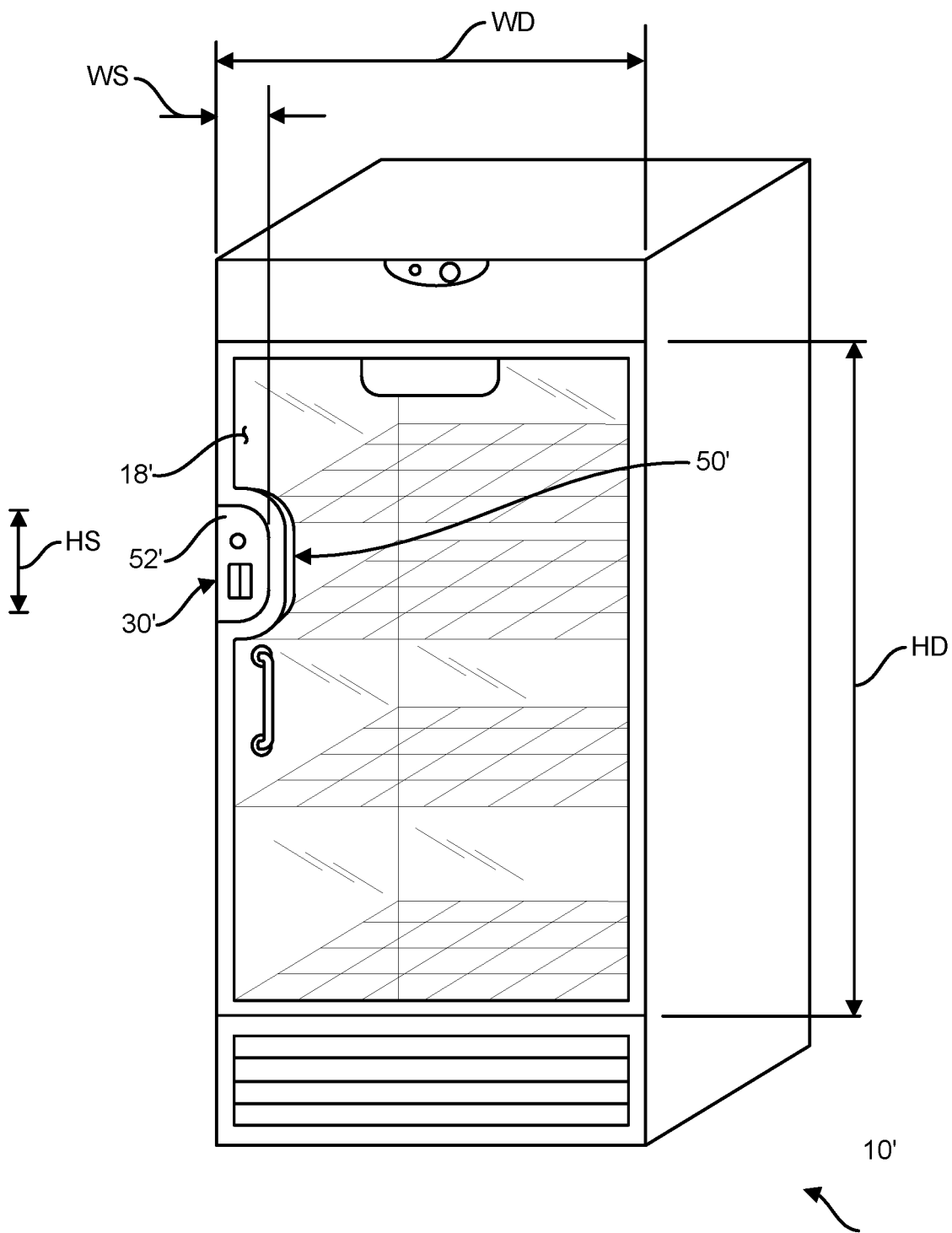
FIG. 5 is a perspective of another embodiment of a refrigerated vending system.

Although the electronics enclosure 50 shown in FIGS. 1 and 2 generally forms a side compartment of similar height and depth to the refrigerated compartment 18, it is contemplated that the electronics enclosure can have other configurations in other embodiments. For example, referring to FIG. 5, another refrigerated vending system 10' comprises an electronics enclosure 50' that has a height that is substantially less than the height of the refrigerated compartment. Except as otherwise noted, the refrigerated vending system 10' can have the same capabilities and components as the refrigerated vending system 10. Parts of the refrigerated vending system 10' that correspond with parts of the refrigerated vending system 10 are given the same reference number, followed by a prime symbol. The electronic enclosure 50' of FIG. 5 includes a front payment terminal support wall 52' that overlaps the width WD of the door 16'. The electronics enclosure 50' and the front payment terminal support wall 52' are positioned heightwise at a comfortable position for a user to present a form of payment to the payment terminal 30' mounted on the support wall 52'. In the embodiment shown in FIG. 5, the door 16' has a height HD and a width WD and the payment terminal support wall 52' has a height HS and a width WS. In one or more embodiments, the height HS is less than 25% (e.g. less than 15%, less than 10%, less than 5%, less than 4%, less than 3%) of the height HD. For example, the height HS can be less than or equal to 50 cm (e.g., less than or equal to 30 cm, less than or equal to 15 cm, less than or equal to 10 cm). In certain embodiments, the width WS is less than 20% (e.g. less than 15%, less than 10%, less than 5%, less than 4%, less than 3%) of the width WD of the door. For example, the width WS is less than or equal to 10 cm (e.g., less than or equal to 8 cm, less than or equal to 5 cm). It can be seen that the electronics enclosure of FIG. 5 has a volume that is even less than the volume of the electronics enclosure of FIGS. 1 and 2.

Figure 6:
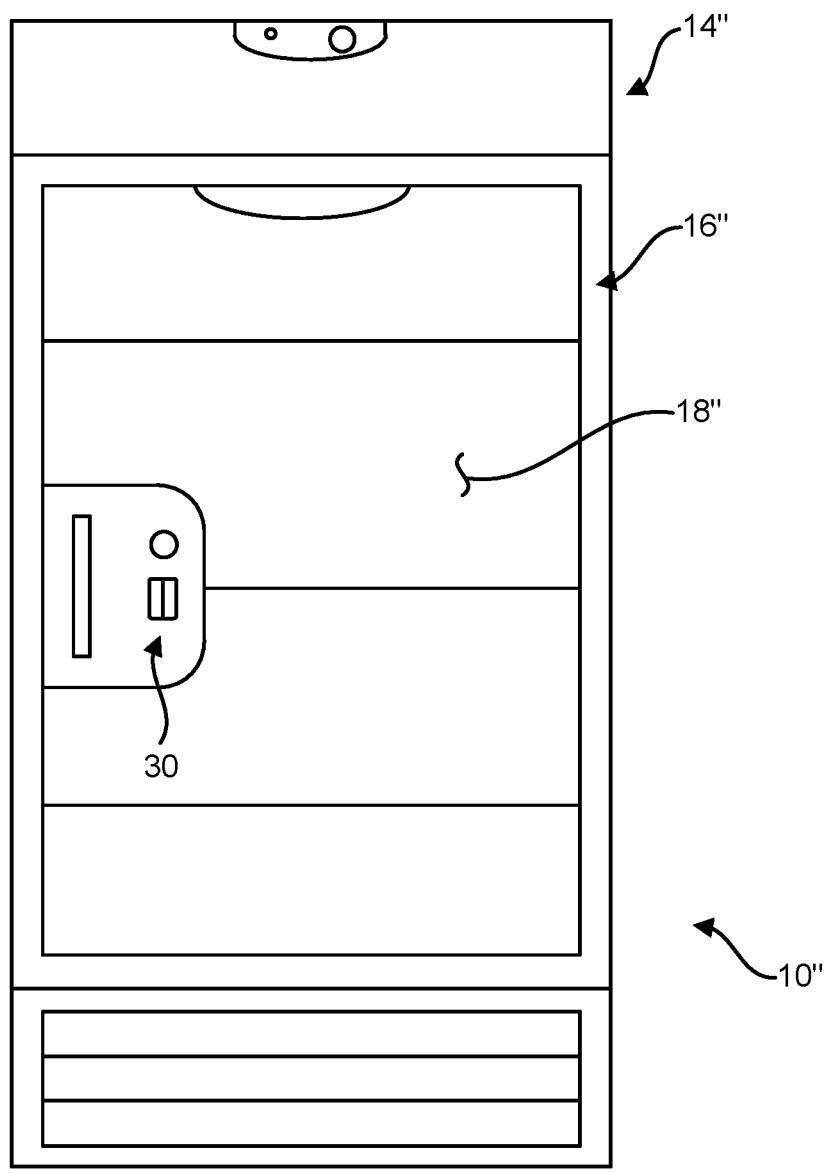
FIG. 6 is a front elevation of another embodiment of a refrigerated vending system.

Other configurations are also possible. For example, referring to FIG. 6, another embodiment of a refrigerated vending system 10" is configured so that the payment terminal 30" is mounted on the door 16" for movement relative to the cabinet 14" with the door between the open and closed positions, instead of being mounted on a stationary wall in fixed relation with the cabinet 14. Except as otherwise noted, the refrigerated vending system 10" can have the same capabilities and components as the refrigerated vending system 10. Parts of the refrigerated vending system 10" that correspond with parts of the refrigerated vending system 10 are given the same reference number, followed by a double-prime symbol. In this embodiment, the electronic components of the controller and the memory (not shown) can be physically contained out of reach, e.g., within the upper or lower section of the cabinet 14" above or below the refrigerated compartment 18". Wires may be routed from the payment terminal 30" to the controller through the door framing to obscure the wires from view.

Figure 7:
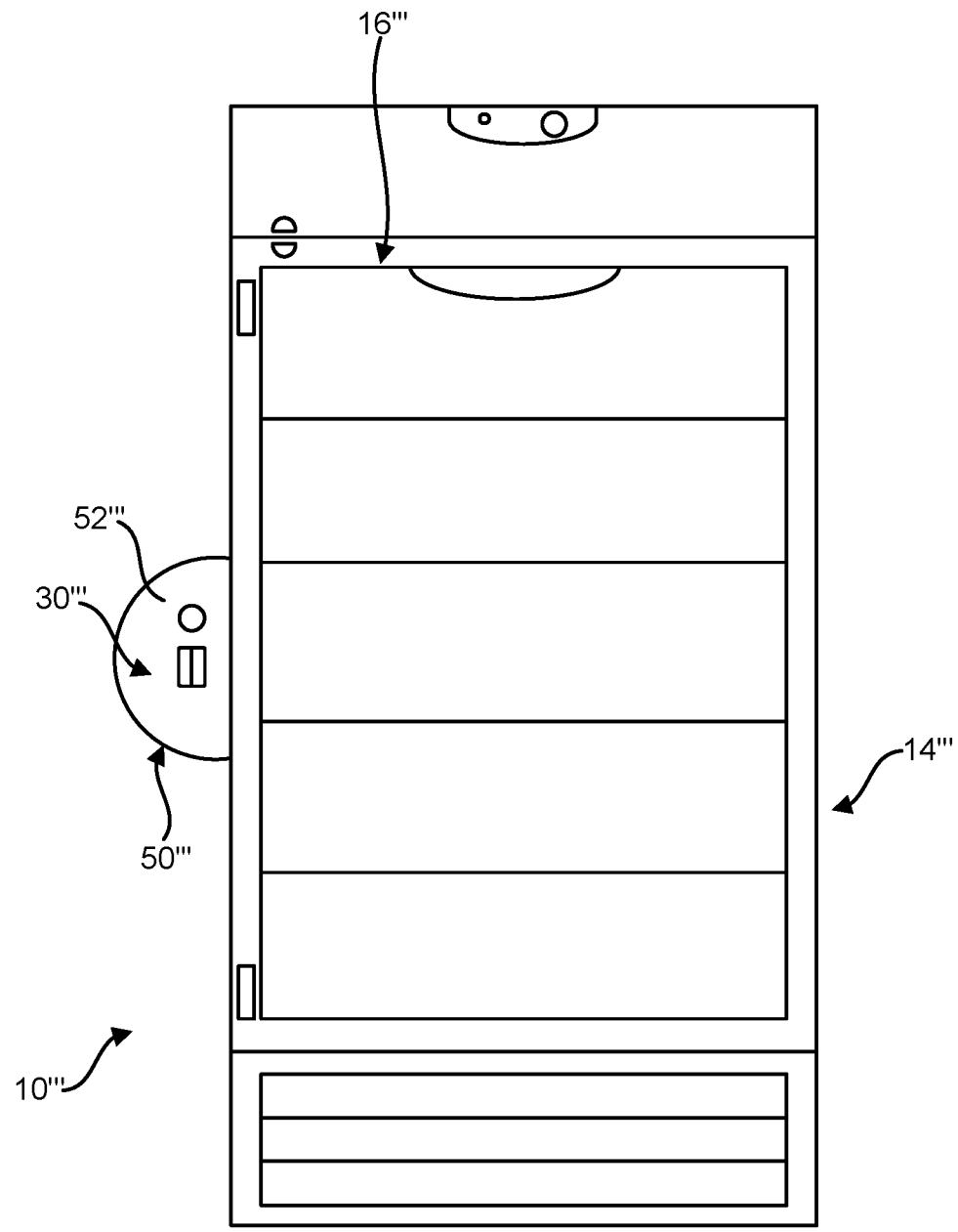
FIG. 7 is a front elevation of another embodiment of a refrigerated vending system.

Referring to FIG. 7, another embodiment of a refrigerated vending system 10''' is configured so that the payment terminal 30''' is mounted on an appendage 50''' to the cabinet 14" which protrudes from the side of the cabinet. Except as otherwise noted, the refrigerated vending system 10''' can have the same capabilities and components as the refrigerated vending system 10. Parts of the refrigerated vending system 10''' that correspond with parts of the refrigerated vending system 10 are given the same reference number, followed by a triple-prime symbol. It can be seen that in this embodiment, the door 16' extends along substantially the entire width and height of the refrigerated compartment and the refrigerated compartment is a full-width compartment of the cabinet 14'. The electronics enclosure 50' is a relatively small appendage that protrudes a short distance from the side of the cabinet 14" and includes the payment terminal 30''' on a front payment terminal support wall 52' of relatively small size.

In general, the controller 42 is configured to automate a vending purchase transaction that allows a purchaser to access all of the merchandise M in the refrigerated cooler 12 by opening the door 16 once a valid form of payment is presented. Then the controller 42 automatically charges the purchaser for any merchandise M that is removed from the refrigerated cooler 12 when the door 16 is closed.

Figure 4:
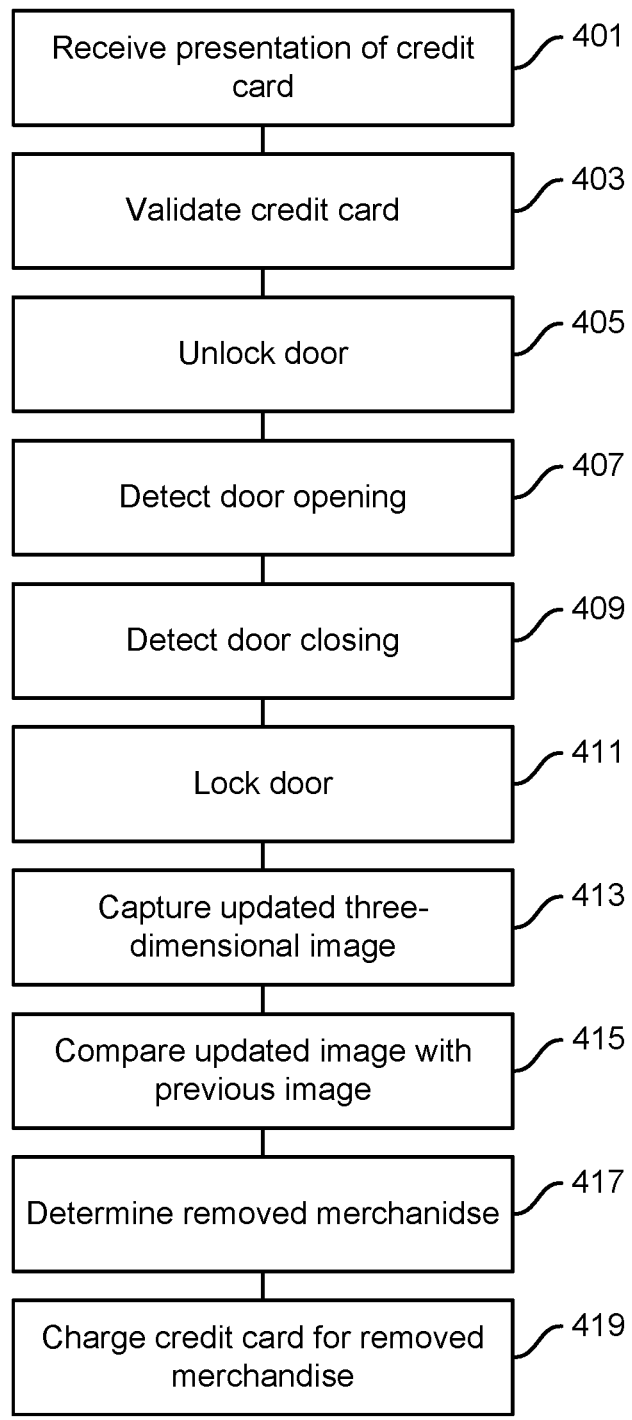
FIG. 4 is a flow chart schematically illustrating the steps of an automated purchasing transaction that is enabled using the refrigerated vending system.

Referring to FIG. 4, an exemplary process 400 for conducting an automated purchase transaction using the refrigerated vending system 10 will now be described. In one embodiment, the refrigerated merchandise M available for purchase via an automated vending purchase transaction comprises a plurality of merchandise containers each having a respective one of a plurality of different container types M1, M2, M3. Each container type M1, M2, M3 has a different shape. The vending transaction controller 42 is configured determine, based on each three-dimensional image taken by the sensor 40, a number of containers of each of the different container types M1, M2, M3 in the refrigerated compartment 18 at the time the three-dimensional image is captured.

Before the process 400 beings, the refrigerated vending system 10 has stored in the memory 44 a three-dimensional image of the refrigerated compartment 18 and/or information about a three-dimensional image of the refrigerated compartment. Suitably, each three-dimensional image taken of the refrigerated compartment includes information from which the controller 42 can determine the quantity of each of a plurality of types of merchandise containers M1, M2, M3 that are stored in the refrigerated compartment. For example, each three-dimensional image can include a three-dimensional map of the boundaries between different types of material. As can be seen in FIG. 2, the appearance in imagery of the boundaries between the chilled air inside the cooler and each of the types of containers M1, M2, M3 will differ in accordance with the shape of the container. Thus, the controller 42 can determine the quantity of each type of container M1, M2, M3 that is present within the refrigerated compartment before an automated purchasing transaction commences. In certain embodiments, the controller 42 does not retain the full three-dimensional image in memory after determining the quantity of each container type M1, M2, M3 in the image. For example, the controller deletes the three-dimensional image data and stores an indication of the determined quantity of each type of container M1, M2, M3 to preserve memory. In addition to storing the three-dimensional image and/or pertinent information about the three-dimensional image prior to conducting an automated purchase transaction process 400, in one or more embodiments, the memory 44 stores indications of the purchase price of each type of merchandise container M1, M2, M3.

The automated purchase transaction process 400 begins when a purchaser approaches the refrigerated vending system 10 and presents a credit card to the electronic payment terminal 30. The payment terminal 30 receives the presentation of the credit card (step 401) and then validates the credit card at 403. If the purchaser's credit card is properly validated, the controller 42 actuates the automatic locks 22 to unlock the door (step 405). In some embodiments, the controller can activate a light, a speaker, or some other indicator (not shown) to provide an indication that the door 16 is now unlocked to allow access to the merchandise M. The purchaser then opens the door 16, and the door opening is detected by the door sensor 24. Thus, at 407 the controller receives a control input from the door sensor 24 indicating that the purchaser has opened the door 16. At this point, the purchaser has uninhibited access to the contents of the refrigerated cooler 12. The purchaser can remove any merchandise from the refrigerated cooler 112 that the purchaser wishes to purchase.

After removing the desired merchandise M the purchaser will close the door 16. In some embodiments, the refrigerated vending system 10 can include a door actuator (not shown) configured to automatically close the door 16 if the purchaser forgets to close the door. The controller 42 may be configured to actuate the door actuator to close the door 16 if, for example, the controller determines based on images captured by the external image sensor 80 that the customer has left the premises without closing the door. Regardless, in the illustrated embodiment, the eventual door closing is detected by the door sensor 24. The door sensor 24 transmits a signal indicative of the door closing to the controller. In response to receiving the signal that the door has been closed at 409, the controller 42 actuates the door locks 22 to automatically lock the door 16 (step 411). At this point access to the merchandise M is restricted until the next time a form of payment is presented to the payment terminal 30. (The process may be repeated whenever another presentation of payment occurs.) Although the vending systems 10 and method 400 are described as including a dedicated door sensor 24, it is not strictly necessary for the door sensor to be a separate unit from the automated door locks 22. For example, the door locks 22 can include an internal mechanism for automatically locking the door when closed and the door lock itself can thus form the door sensor by sending an indication of the door being locked.

In response to receiving the signal that the door 16 has been closed after being opened at 409, the controller 42 actuates the three-dimensional imaging sensor 40 to capture one or more updated three-dimensional images of the refrigerated compartment 18. As explained above, the refrigerated vending system 10 has stored in the memory 44 at least one previous image of the refrigerated compartment 18 and/or information about the previous image that indicates (e.g., depicts) the quantities of merchandise that were present in the interior of the cooler immediately before the door was opened in the current process 400.

The controller 42 is configured to compare the updated image of the refrigerated compartment 18 to a previous image of the refrigerated compartment (step 415), and then based on the comparison, determine which of the merchandise M was removed from the cooler 12 while the door 16 was open (step 417). The vending transaction controller 42 determines the number of containers of each container type M1, M2, M3 that is visible in the refrigerated compartment 18. The controller 42 is suitably programmed to parse the updated three-dimensional image received from the image sensor to identify each unit of each container type M1, M2, M3 in the image. Thus, the controller 42 determines the quantity of containers of each container type M1, M2, M3 in the refrigerated compartment 18 at the time the updated three-dimensional image is captured. In one or more embodiments, the vending transaction controller 42 is configured to determine which of the refrigerated merchandise M was removed while the door 16 was opened by calculating a difference in the number of containers of each container type M1, M2, M3 between the previous three-dimensional image and the updated three-dimensional image.

After determining the removed merchandise M, the controller is configured to automatically charge the purchaser's credit card (or other form of validated payment) for all of the removed merchandise M, thus completing the purchase transaction. In one or more embodiments, the vending transaction controller 42 is configured to charge the method of payment that was presented to the electronic payment terminal 30 in an amount equal to the difference in the number of containers of each container type M1, M2, M3 multiplied by the predetermined price for each container of the respective container type stored in the memory 44.

In one or more embodiments, upon completion of the purchase transaction, the controller 42 is configured to determine based on the updated three-dimensional image whether one or more types M1, M2, M3 of refrigerated merchandise is running low. In an embodiment, the controller 42 is configured to transmit an indication to the remote inventory manager 48 when one or more types of refrigerated merchandise is running low. The remote inventory manager 48 may push a notification (e.g., via email or text message) to the vending system operator to notify the vending system operator that the cooler 12 needs restocking.

As can be seen, the illustrated refrigerated vending system 10 enables a purchaser to purchase multiple items of merchandise in a single purchase transaction. In comparison with scale-based vending systems of the prior art, the illustrated vending system 10 requires much smaller and easier-to-program electronic components. Moreover, the three-dimensional imaging capabilities of the refrigerated vending system 10 enable accurate determination of the quantities of merchandise M that a customer purchases, even if the customer rearranges the merchandise on the shelves 20. The refrigerated vending system 10 is not dependent on particular items being located at particular locations in the refrigerated compartment 18 to accurately detect the quantity of items that were removed. For example, if a customer moves a container of a first container type M1 from an upper shelf to a lower self while selecting merchandise, the refrigerated vending simply detects the container on the lower shelf in the updated three-dimensional image. The customer will not be inadvertently charged for simply rearranging merchandise M in the cooler 12.

When introducing elements of the present disclosure or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the disclosure are achieved and other advantageous results attained.

As various changes could be made in the above products and methods without departing from the scope of the disclosure, it is intended that all matter contained in the above description shall be interpreted as illustrative and not in a limiting sense.

What is claimed is:

1. A refrigerated vending system for conducting automatic purchase transactions for refrigerated merchandise, the refrigerated vending system comprising:
    a refrigerated cooler comprising a cabinet having a refrigerated compartment and a door connected to the cabinet for movement with respect to the cabinet between a closed position in which the door closes the refrigerated compartment and an open position in which the door opens the refrigerated compartment, the cabinet comprising one or more shelves for supporting the refrigerated merchandise in the refrigerated compartment of the refrigerated cooler;
    an automatic lock configured to selectively lock and unlock the door in the closed position;
    a door sensor configured to detect movement of the door from the open position to the closed position;
    a three-dimensional imaging sensor inside the refrigerated cooler, the three-dimensional imaging sensor being configured to capture a three-dimensional image of the refrigerated compartment of the cabinet;
    an electronic payment terminal supported on the refrigerated cooler; and
    a vending transaction controller configured to;
        detect presentation of a method of payment to the electronic payment terminal;
        actuate the automatic lock to unlock the door;
        determine based on the door sensor that the door has been opened and closed after actuating the automatic lock to unlock the door;
        actuate the automatic lock to lock the door in response to determining based on the door sensor that the door has been opened and closed;
        actuate the three-dimensional imaging sensor to capture an updated three-dimensional image of the refrigerated compartment in response to determining based on the door sensor that the door has been opened and closed;
        determine, based on the updated three-dimensional image, the refrigerated merchandise that was removed while the door was open; and
        charge the method of payment that was presented to the electronic payment terminal for the refrigerated merchandise that was removed while the door was open.

2. A refrigerated vending system as set forth in claim 1, wherein the vending transaction controller is configured to wirelessly transmit an indication that one or more types of refrigerated merchandise is running low to remote inventory management system.

3. A refrigerated vending system as set forth in claim 1, wherein the vending transaction controller is configured to determine based on the updated three-dimensional image whether one or more types of refrigerated merchandise is running low.

4. A refrigerated vending system as set forth in claim 1, wherein the door sensor comprises at least one of a proximity sensor and a contact sensor.

5. A refrigerated vending system as set forth in claim 1, wherein the automatic lock comprises one of a magnetic locking mechanism and a deadbolt locking mechanism.

6. A refrigerated vending system as set forth in claim 1, wherein the electronic payment terminal is mounted on the door for movement relative to the cabinet with the door between the open and closed positions.

7. A refrigerated vending system as set forth in claim 1, wherein the refrigerated cooler has a height and the one or more shelves comprises a plurality of shelves at vertically spaced apart locations along the height.

8. A refrigerated vending system as set forth in claim 7, wherein cabinet has a top wall and the three-dimensional imaging sensor is a single unit mounted on the top wall such that the three-dimensional image is taken vertically through the plurality of shelves.

9. A refrigerated vending system as set forth in claim 1, wherein the cabinet defines an electronics enclosure that is separate from the refrigerated compartment, one or more local processors of the vending purchase transaction controller being stored in the electronics enclosure.

10. A refrigerated vending system as set forth in claim 9, wherein the door has a height and the electronics enclosure has a height along the height of the door that is less than 25% of the height of the door.

11. A refrigerated vending system as set forth in claim 9, wherein the refrigerated cooler has a width and the electronics enclosure has a width along the width of the refrigerated cooler that is less than 5% of the width of the refrigerated cooler.

12. A refrigerated vending system as set forth in claim 11, wherein the refrigerated compartment has a volume and the electronics enclosure has a volume, wherein the volume of the electronics enclosure is less than 10% of the volume of the refrigerated compartment.

13. A refrigerated vending system as set forth in claim 1, wherein the cabinet includes a payment terminal support wall, the electronic payment terminal being mounted externally on the payment terminal support wall.

14. A refrigerated vending system as set forth in claim 13, wherein the door has a height and a width and the payment terminal support wall has a height and a width.

15. A refrigerated vending system as set forth in claim 14, wherein the height of the payment terminal support wall is less than 15% of the height of the door.

16. A refrigerated vending system as set forth in claim 14, wherein the width of the payment terminal support wall is less than 10% of the width of the door.

17. A refrigerated vending system as set forth in claim 14, wherein the payment terminal support wall and the door define a front side of the refrigerated cooler.

18. A refrigerated vending system as set forth in claim 17, wherein the payment terminal support wall overlaps the width of the door.

19. A refrigerated vending system as set forth in claim 17, wherein the payment terminal support wall does not overlap the width of the door.

20. A refrigerated vending system as set forth in claim 1, wherein the refrigerated merchandise comprises a plurality of containers each having a respective one of a plurality of different container types, wherein the vending transaction controller is configured determine based on each three-dimensional image a number of containers of each of the plurality of different container types in the refrigerated compartment at the time the three-dimensional image was captured.

21. A refrigerated vending system as set forth in claim 20, wherein the vending transaction controller is configured to determine which of the refrigerated merchandise was removed while the door was opened by calculating a difference in the number of containers of each of the plurality of different container types between a previous three-dimensional image and the updated three-dimensional image.

22. A refrigerated vending system as set forth in claim 21, wherein the vending transaction controller is configured to charge the method of payment that was presented to the electronic payment terminal in an amount equal to said difference in the number of containers of each of the plurality of different container types multiplied by a predetermined price for each container of the respective container type.

23. A refrigerated vending system as set forth in claim 1, further comprising an external imaging sensor configured to capture images of a region in front of the refrigerated vending system.

24. A refrigerated vending system as set forth in claim 23, further comprising a motion detector configured to detect motion in the region in front of the refrigerated vending system.

25. A refrigerated vending system as set forth in claim 24, wherein the external imaging sensor is activated when the motion detector detects motion in the region in front of the refrigerated vending system.

26. A refrigerated vending system as set forth in claim 23, further comprising a processor configured to receive the images captured by the external imaging sensor and determine one or more customer engagement parameters based on the images captured by the external imaging sensor.

27. A refrigerated vending system for vending refrigerated merchandise, the refrigerated vending system comprising:
a refrigerated cooler comprising a cabinet having a refrigerated compartment for holding the refrigerated merchandise;
one or more sensors in the refrigerated compartment for detecting refrigerated merchandise in the refrigerated compartment;
a vending transaction controller connected to the one or more sensors and configured for executing a purchase transaction for the refrigerated merchandiser using information from the one or more sensors;
one or more communications lines extending from the one or more sensors to the vending transaction controller; and
an electronics enclosure, the vending transaction controller being located in the electronics enclosure, the one or more communications lines connecting to the vending transaction controller inside the electronics enclosure,
wherein the refrigerated compartment has a volume; and
wherein the electronics enclosure has a volume that is less than 15% of the volume of the refrigerated compartment.

28. A refrigerated vending system as set forth in claim 27, further comprising a user interface by which the user interacts with the vending transaction controller for making a purchase.

29. A refrigerated vending system as set forth in claim 28, wherein the user interface device is supported directly on the electronics enclosure.

* * * * *